(12) United States Patent
Goldberg et al.

(10) Patent No.: US 8,143,575 B2
(45) Date of Patent: Mar. 27, 2012

(54) DETECTION OF HIGH Z MATERIALS USING REFERENCE DATABASE

(75) Inventors: Jacques Goldberg, Haifa (IL); Isaac Shpantzer, Bethesda, MD (US); Yaakov Achiam, Rockville, MD (US); Nadya Reingand, Baltimore, MD (US)

(73) Assignee: CeLight, Inc., Silver Spring, MD (US)

( * ) Notice: Subject to any disclaimer, the term of this patent is extended or adjusted under 35 U.S.C. 154(b) by 348 days.

(21) Appl. No.: 12/618,303

(22) Filed: Nov. 13, 2009

(65) Prior Publication Data

US 2010/0065745 A1     Mar. 18, 2010

Related U.S. Application Data

(63) Continuation-in-part of application No. 11/626,920, filed on Jan. 25, 2007, now Pat. No. 7,652,254, and a continuation-in-part of application No. 11/947,058, filed on Nov. 29, 2007, and a continuation-in-part of application No. 12/272,780, filed on Nov. 17, 2008, now Pat. No. 7,897,925.

(60) Provisional application No. 61/115,691, filed on Nov. 18, 2008.

(51) Int. Cl.
    *G01T 1/00*     (2006.01)

(52) U.S. Cl. ...................................... 250/336.1; 250/306
(58) Field of Classification Search ............... 250/336.1, 250/306
    See application file for complete search history.

(56) References Cited

U.S. PATENT DOCUMENTS

| | | | | |
|---|---|---|---|---|
| 4,504,438 | A * | 3/1985 | Levy et al. | 376/156 |
| 7,701,336 | B1 * | 4/2010 | Willms et al. | 340/540 |
| 7,908,121 | B2 * | 3/2011 | Green | 702/189 |
| 2006/0180753 | A1 * | 8/2006 | Bryman | 250/266 |
| 2008/0191133 | A1 * | 8/2008 | Morris et al. | 250/307 |

* cited by examiner

*Primary Examiner* — David Porta
*Assistant Examiner* — Hugh H Maupin
(74) *Attorney, Agent, or Firm* — Nadya Reingand

(57) ABSTRACT

A method and system for high Z substance revealing using muon detection technique is presented. Natural muon coordinate and incidence angle are measured above and below the interrogated volume. The muon deviations after passing through the interrogated volume are compared with the reference deviations obtained for the same volume in absence of high Z material. A correlation between the actual data and reference data is calculated using Kolmogorov-Smirnov test, though other approaches may apply. The correlation is used for the decision making on the presence of a nuclear substance inside the volume.

20 Claims, 6 Drawing Sheets

10cm box

Air

Iron

Uranium

Guessed mix

US 8,143,575 B2

DETECTION OF HIGH Z MATERIALS USING REFERENCE DATABASE

CROSS-REFERENCE TO RELATED APPLICATIONS

The present invention claims the benefit of U.S. Provisional Application Ser. No. 61/115,691, filed Nov. 18, 2008; the present invention is a continuation-in-part of U.S. patent application Ser. No. 11/626,920 filed Jan. 25, 2007 now U.S. Pat. No. 7,652,254, Ser. No. 11/947,058, filed Nov. 29, 2007 and Ser. No. 12/272,780, filed Nov. 17, 2008, all of which are fully incorporated herein by reference.

FIELD OF INVENTION

This invention relates generally to the systems and methods for revealing hidden uranium, plutonium and other high Z materials using muon detection technique.

BACKGROUND OF THE INVENTION

A flow of cosmic rays constantly bombards Earth. Primary cosmic rays consist of single protons (about 90% of all cosmic rays) and alpha particles (majority of the remaining 10%). When these primary cosmic rays hit Earth's atmosphere at around 20,000 m above the surface, the impacts cause nuclear reactions, which produce pions. These pions decay into a muon and muon neutrino at about 9000 m altitude. Many muons decay on the way down into neutrinos and an electron while others reach the surface, and there are still enough particles to be detected fairly easily. About 7,200 muons rain down on each square meter of Earth every minute. This flux is approximately uniform over the Earth's surface.

Muons are electrically charged unstable elementary particles with a mean energy of about 3 GeV, which rain down upon the surface of the earth, traveling at almost the speed of light. The muon has an average half-life of $2.2 \cdot 10^{-6}$ s and weight of $1.88 \cdot 10^{-28}$ kg. The angular distribution of the muons is proportional to $\cos^2 \alpha$, where $\alpha$ is calculated from the vertical direction.

Cosmic muons observed at sea level come from the decay of unstable pions produced in the upper part of the atmosphere in amounts decreasing with decreasing altitude starting downwards from about 20,000 meters. These pions are produced in nuclear collisions with the air of extraterrestrial protons and a small amount of other nuclei. The muons are not monoenergetic. FIG. 1 shows the most recent and most accurate measurements of the momentum p of the muons, presented by David Gertsle in "Cosmic ray flux study", Oct. 17, 2007. Here muon energy E is related to the momentum and the muon mass m by Einstein's formula $E^2 = p^2 + m^2$.

Various detection techniques were proposed for muons detectors, Muon detectors described below are presented here for the purpose of proof of the systems feasibility. However it does not limit the concept of the present invention to this particular type of detectors.

Cloud chambers with supersaturated vapor and bubble chambers with high pressure liquid were widely used in the past. They allow visualizing the muon trajectory. If the chamber is equipped with a three-dimensional coordinate system, the muon incident angle and coordinate can be measured. Thick layers of photoemulsion were the first detectors used to the muon registration.

The most suitable types of muon detectors for the current system are wire chambers and drift chambers. The wire chambers consist of very large number of parallel wires, where each wire acts as an individual detector. A particle leaves a trace of ions and electrons, the latter drift toward the nearest wire. By marking off the wires which had a pulse of current, one can see the particle's path. Several planes of wires with different orientations are used to determine the position of the particle very accurately. One embodiment of wire chamber detectors is shown in FIG. 2. Typically the chamber 1 has two windows 2 and 2a. Gas pump 3 is connected with the chamber by inlet and outlet pipes 4 and 5. Three wire gratings are inserted between the windows: two cathode wire planes 6 and 7 and a sense wire plane 8 located in between. Output 9 yields a signal caused by a muon passing through the chamber. Varying voltages applied from the source 10 to the anode wires produce a field in which ionization electrons cause an avalanche towards the nearest sense wire. Additionally the wire detector can be equipped with scintillation detectors. They may be located at the windows 2 and 2a and measure the time of flight for each muon passing the system. The knowledge of the time of flight helps to estimate the muon velocity.

Alternatively drift chambers can be implemented for muon coordinate measurement in the present invention. The coordinate resolution in best muon detectors (such as drift tubes) can be as good as 50 micrometers.

Additionally, a scintillation fiber detector may be used for muon sensing. Such detector has a good spatial resolution. They can be made by forming layers of plastic optical fibers made out of scintillator material coated with a lower refractive index cladding. These can typically have a diameter of 0.5 to 1 mm. The small size of each independent scintillator means that many readout channels (typically tens of thousands) are required, and it is not practical to equip each one with its own photomultiplier. One solution to this is to gather the fibers into a bundle and connect to an image intensifier. This amplifies the light while maintaining an image, which can then be viewed with a CCD camera, and the position on the image associated with a particular fiber.

Since other particles are stimulating the detector as well, a system of two detectors was proposed to avoid false muon detection. Other particles originating from i.e. terrestrial radiation will also cause stimulation, but those particles disappear after passing the short distance, because they are absorbed by nuclear interactions. The detection that occurs almost instant in both detectors is considered as a successful detection of a muon. Muons shielding is not limited to above mentioned additional detector; any other types of shielding can be in order to separate muons from other charged particles.

A sandwich of two coordinate detectors located along the muon path allows simultaneous detecting both the incident angle of the muon and its locations.

It is known that muons easily penetrate most of the materials, because they have only electromagnetic interactions. However an increase of the muon deflection due to Coulomb scattering is observed when they pass materials with high atomic number Z such as nuclear or gamma-ray-shielding materials. Two materials that can be used to make an atomic bomb: plutonium-239 and highly enriched uranium with at least 20 percent of uranium-235. Since both materials have high Z numbers, both can be detected by muon technique. Probability of muon deflection angle approximately forms a Gaussian distribution with a zero mean angle and a width that depends on the material Z number. While muon deflection in 10 cm of aluminum is up to about 10 milliradians, it reaches a value of about 80 milliradians in uranium and plutonium.

Current technologies for nuclear material detection are limited to X-ray and Gamma ray equipment. Both systems must be accurately handled, and their emissions properly controlled. There is a need for reliable and safety system to unveil hidden nuclear materials. Muon detection technique provides a safety alternative with improved penetration ability. The present invention is a continuation-in-part of U.S. patent application Ser. No. 11/626,920, which discloses a system and method for nuclear material detection using muons; this patent application is fully incorporated herein by reference. Since cosmic muons are not monoenergetic, the distribution of the scattering angle depends on the muon energy, the atomic number Z of the material, and the thickness of materials traversed by the muon. There is a need to take into account the distribution of muons' energies when an observation of muon scattering caused by high Z material is performed. A method and system for taking into account the low energy muons contribution into the final measurement result was discussed in details in U.S. patent application Ser. No. 11/947,058 by the same inventors as the present invention; it is fully incorporated herein by reference. There is a need to improve the detection sensitivity and reliability by further optimization of the muon deviation data processing. The present invention discloses a procedure that allows improving the system reliability and sensitivity. The procedure includes comparing the obtained data on muon deviation in the interrogated volume with reference deviation distributions from a database.

SUMMARY OF THE INVENTION

The system and method are disclosed for nuclear materials detection by muon flow sensing. The system comprises a series of muon detectors for efficiently measuring muons deflection caused by the presence of high Z materials. The presence of high Z material is suspected inside the interrogated volume when an average deflection of multiple muons, registered by the system, is above some predetermined value. The muon location and incident angle are measured for each muon above and below the interrogated volume during some exposure time. Typically the exposure time is about one minute. A DSP unit calculates the muon deviation distribution, where the deviation is the change of the angle in muon trajectory. The obtained muon deviation distribution is compared with a distribution from a database. The database contains (1) the results of numerical simulations of muon deviation distributions, and (2) experimental results accumulated in the process of the system exploitation. The DSP unit performs a correlation procedure to compare the obtained deviation distribution with the data from the database. A decision on the presence or absence of the high Z material inside the interrogated volume is made, when the correlation between the actual and the reference deviation distributions is below or above a predetermined value, respectively.

In the preferred embodiment, the numeric simulation of the muon deviation distribution is performed taking into account (1) the muon velocity distribution and (2) the muon incident angle distribution, both obtained by experimental measurements. The numeric simulations are performed implementing a multiple scattering algorithm such as used in GEANT4 program by CERN (the European Organization for Nuclear Research).

In another embodiment the reference database is formed from experimental results of measurements of the muon deviations caused by a presence of various objects inside the interrogated volume. It may be constantly updated with the experimental data during the system exploitation; each result of testing is forwarded to the reference database.

In the preferred embodiment the correlation of the actual and reference deviation distributions is evaluated using the moments of the distributions including mean, standard deviation, skewness, and curtosis. In another embodiment it is evaluated using the Kolmogorov-Smirnov test. In yet another embodiment it is evaluated using a principal component analysis via Karhunen Loeve transform.

Another object of the present invention is a method for high Z material revealing, comprising continuously measuring a first location and a first incident angle of incoming muons by a first detector, continuously measuring a second location and a second incidence angle for each incoming muon by a second detector, accumulating data on the first and second muon locations and the first and second incidence angles during a time interval; computing the distribution of deviations of all muons participating in the exposure; wherein the deviation is the difference between the first and the second angles; and making a decision on the presence or absence of the high Z material inside the interrogated volume if a correlation between the actual deviation distribution and a reference deviation distribution from a database is below or above a predetermined value, respectively.

DETAILED DESCRIPTION OF THE PREFERRED EMBODIMENT

The present invention now will be described more fully hereinafter with reference to the accompanying drawings, in which the preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In one embodiment of the present invention, the muon detectors are the wire detectors similar to described above with the gratings make an anode, one above and one below the wires, while the wires make an anode. The gratings are printed strips, not wires, and the anode wires are spaced closer than the strips. The combination of a very thin (typically 50 microns) wire yielding a very high electrostatic field near the wire, very dense spacing of wires (typically 1.5 mm), critical choice of the gas mixture which must be as easily ionisable as possible (for example, a critical mix of n-pentane and $CO_2$), but not causing a spark, and the highest anode voltage which does not immediately cause a spark, is what produces at the end a measurable charge. The strips are critical for sampling the distribution of the opposite (positive ions, thus strips are cathodes) induced charge on an otherwise flat cathode plane.

This sampling provides us the exact location of the ionization using a specially designed numerical algorithm (software).

Figure 1:
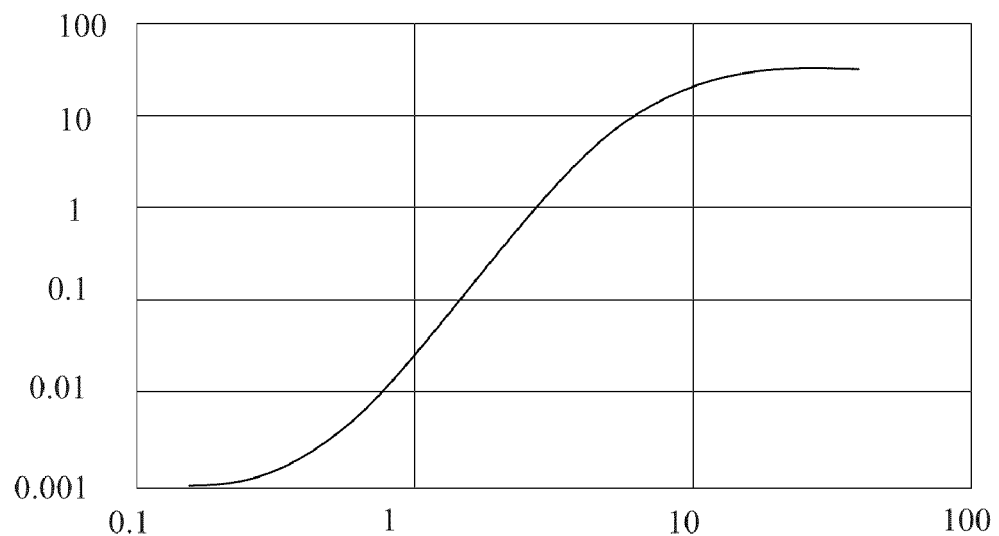
FIG. 1 Momentum distribution of atmospheric muons.
Figure 2:
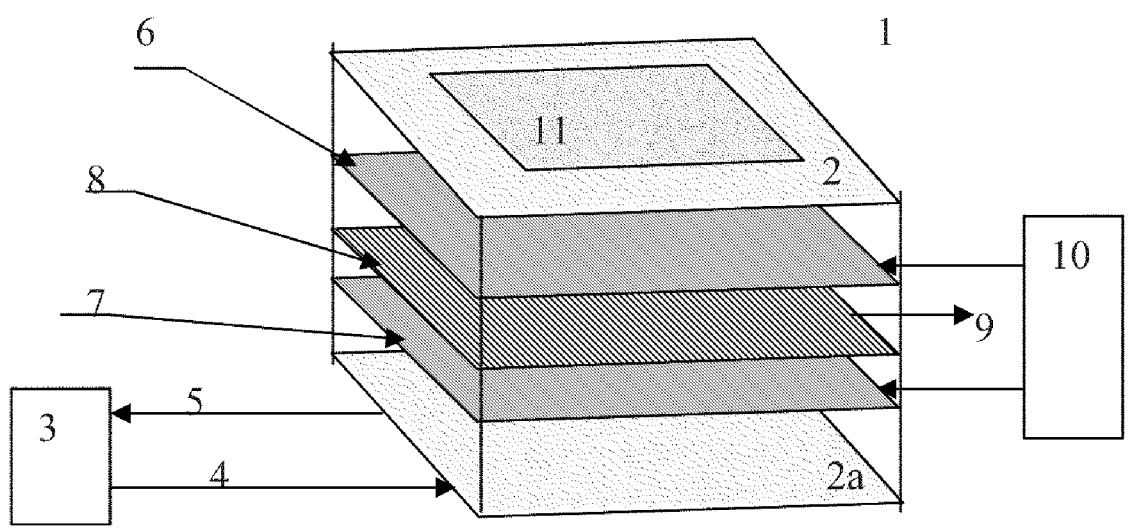
FIG. 2 A detector for muon location and angle measurement.
Figure 3:
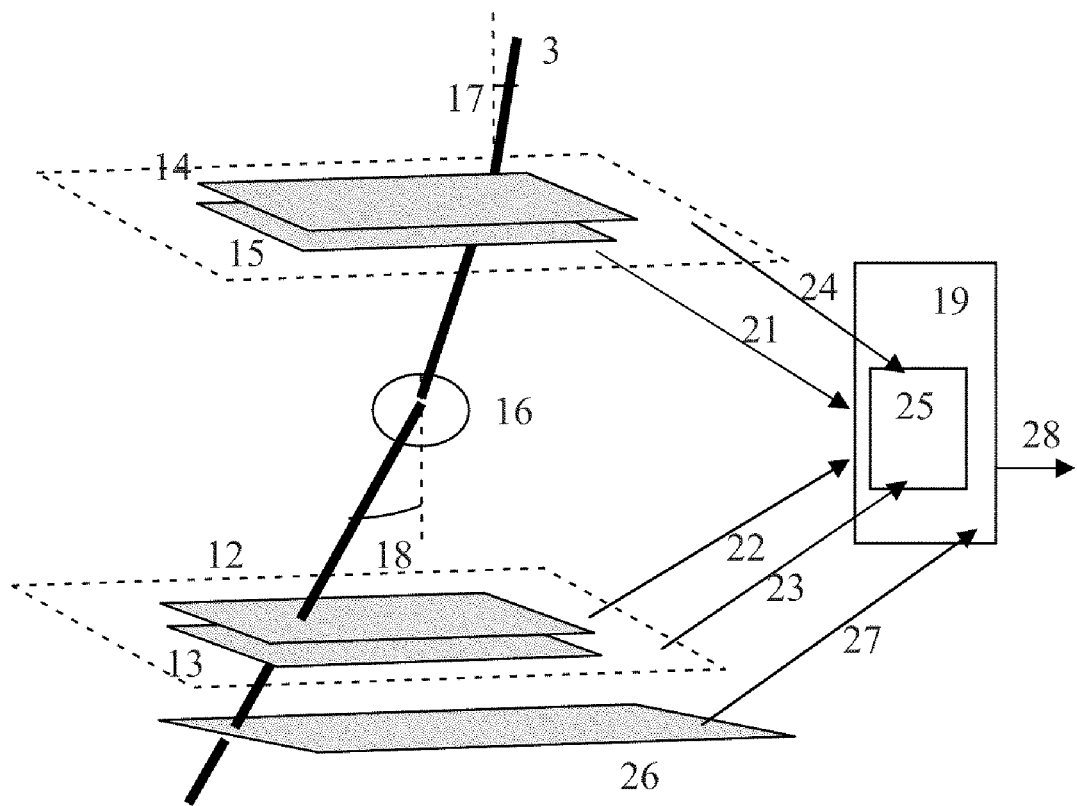
FIG. 3 A system for measurement of muon deflection caused by high Z material.

In one embodiment of the present invention, a system for high Z material detection is proposed as shown in FIG. 3. In the preferred embodiment two detectors 12 and 13 are positioned below the interrogated area, for example, on the ground or under the ground. Similar muon detectors 14 and 15 are positioned above the ground level. Each group of the detectors 12,13 and 14,15 allows measuring the muon location and incidence angle, preferably with an accuracy of at least 1 milliradian in angle and at least 1 millimeter in coordinate. In the absence of high Z material between upper and lower detectors the muon incidence angle is the same as its leaving angle. In the presence of high Z material 16 a muon deflection is observed. The incidence angle 17 at the top sensor 14,15 differs from the leaving angle 18 at the bottom sensor 12, 13. In fact the muon deflection is more complicated multiscattering process, and FIG. 3 represents a simplified case. The muon deviation is the difference between the incident angle 17 and the leaving angle 18. Each sensor 12-15 constantly registers flow of muons passing through. All these data is accumulated during an exposure time in a Digital Signal Processing (DSP) unit 19.

Figure 4:
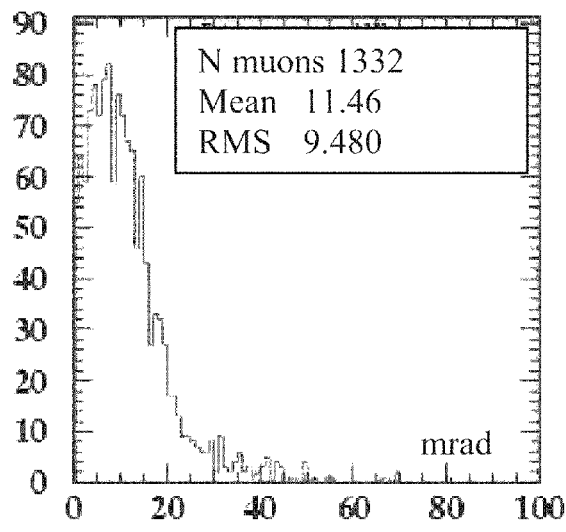
FIG. 4 The results of computer simulation showing the distribution of muon deviations caused by various fillers inside the interrogated volume.
Figure 4:
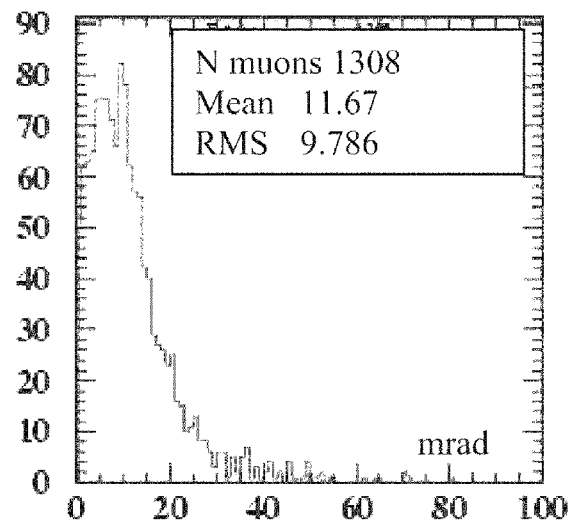
Figure 4:
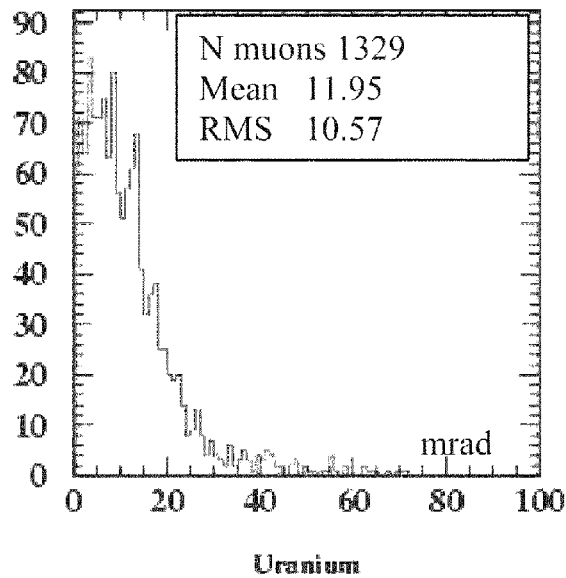
Figure 4:
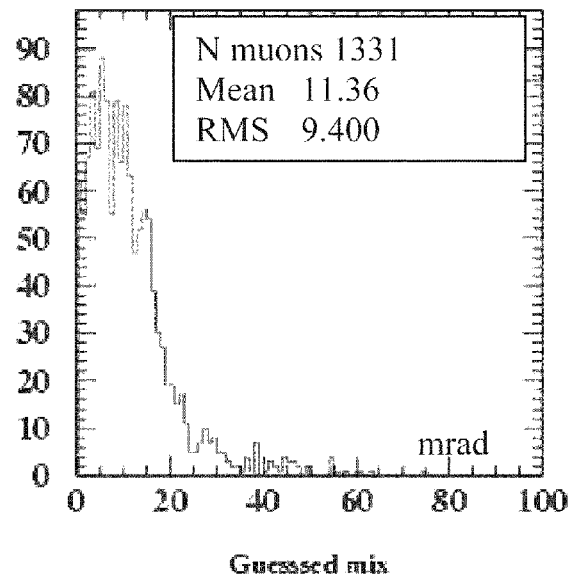

While a muon traverses high Z material, it experiences electrical interaction with the material atoms and undergoes a large number of electromagnetic scattering. The probability distribution of the resulting deflection angle is characterized by a width $\sigma$ in three-dimensional space, $\sigma^2=\sigma_1^2+\sigma_2^2$, where $\sigma_1$ and $\sigma_2$ are the plane projections. The width is expressed by modified Moliere formula as following (FIG. 4):

$$\sigma^2=(0.015/vP)^2(X/X_0)[1+0.12 \log(X/X_0)]^2$$

where X is the thickness traversed, P the momentum and v the velocity of the muon, and radiation length $X_0$ is a characteristic of the traversed material, equal to 300 m for air, 9 cm for Aluminum, 1.8 cm for Iron, 0.56 cm for Lead, 0.32 cm for Uranium. The width $\sigma$ is in inverse proportion to the squared velocity as shown in FIG. 4. Obviously, slow muons experience a large scattering on various types of materials, and this effect must be taken into consideration. In one embodiment the distribution width dependence on the muon velocity is taken into account, when the measurement data is processed in the DSP unit 19.

The implementation of Moliere formula has been discussed in the prior patent application U.S. patent application Ser. No. 12/272,780, filed Dec. 14, 2007 by the same inventive entity. In the present application we used a new multiple scattering (MSC) model to simulate the multiple scattering of charged particles in matter. This model does not use the Moliere formalism, but is based on the more complete Lewis theory. The model belongs to the class of condensed simulations and was used in recent CERN's (the European Organization for Nuclear Research) GEANT4 tracking simulation package. GEANT4 is a toolkit for the simulation of the passage of particles through matter. Its areas of application include high energy, nuclear and accelerator physics, as well as studies in medical and space science.

The purpose of the invention is to determine if one may reasonably safely skip human inspection of the contents of the container. There is no attempt to perform a 3D reconstruction of the contents. The results of the DSP processing do not predict the location of an interrogated material, but rather eliminate necessity to open the container, which is guaranteed to be not dangerous.

The DSP unit 19 accumulated data on muon incident angles and locations during an exposure time interval. For each muon, an angle deviation is calculated, where the deviation is the difference between the incoming angle and output angle. Sample deviation distributions obtained by numerical simulation are shown in FIG. 4. The interrogated volume is filled with various fillers: air, iron, uranium.

In our system the processing is based on comparing the distribution of the actual experimentally obtained deviation for muons accumulated during some initial time interval with a reference distribution. Typically a one squared meter module (~7500 muons) data is collected within one minute interval.

The database contains (1) the results of numerical simulations of muon deviation distributions, and (2) experimental results accumulated in the process of the system exploitation. The DSP unit performs a correlation procedure to compare the obtained deviation distribution with the data from the database. A decision on the presence or absence of the high Z material inside the interrogated volume is made, when the correlation between the actual and the reference deviation distributions is below or above a predetermined value, respectively.

The reference distribution set is a library of simulations obtained with random fillings of the container with objects of random dimensions made of materials free of high Z substance, additionally taking into account the statistical and systematic errors built in the detector such as thermal fluctuations, mechanical and electronic nonlinearities, etc. In the preferred embodiment, the numeric simulation of the muon deviation distribution is performed taking into account (1) the muon velocity distribution and (2) the muon incident angle distribution, both obtained by experimental measurements. The numeric simulations are performed implementing a multiple scattering algorithm such as used in GEANT4 program by CERN (the European Organization for Nuclear Research).

The reference distribution also includes a library of actual analysis of real containers found by human inspection to be free of any high Z material. This factual data supersedes simulated referencing, since it is free from limitations caused by a model for the simulation, and besides it includes all statistical and systematic inaccuracies of real muon detectors.

When the actual and reference distributions are compared, the reliability of the resulting decision on the presence of high Z material depends on the sample size of the actual and of the reference distributions. The larger databases assure better accuracy of the decision. We use self updating software, which consistently accumulates the actual samples filtered as "definitely not suspect" and adds them into the database. This enlarges the size of the reference distribution database and improves the system reliability.

In statistics, a result is called statistically significant if it is unlikely to have occurred by chance. The container testing procedure according to the present invention may include at least three steps, depending on the result significance. When the significance is not sufficient to eliminate a "type I" error, the scan has to be repeated (which is a second step) to double the significance; this means applying four times longer exposure for the scanning Type I errors will be discussed in the next paragraph. If the result still not conclusive, then at the third step it is opened and inspected by an officer.

Type I error, also known as an "error of the first kind", an $\alpha$ error, or a "false positive": the error of rejecting a null hypothesis when it is actually true. A "null hypothesis" corresponds to a presumed default "state of nature", in our case an absence of high Z material inside the interrogated volume. Corresponding to the null hypothesis is an "alternative hypothesis" which corresponds to the opposite situation that is when the material is present. The goal is to determine accurately if the null hypothesis can be discarded in favor of the alternative.

The scanning is conducted, and data are obtained. The result of the test may be negative (that is, it does not indicate the presence of the high Z material). On the other hand, it may be positive (that is, it may indicate the material). In our case, the type I error corresponds to indication that the object contains the dangerous material, while in reality it is not.

Additional tests to be performed include a measurement of the attenuation of the muons in the container: ratio of the number of incoming muons counted by the set of exit counters divided by the number for the entrance counters. This is a powerful addition to the analysis of the angular distributions in the case, for example, of some high Z material hidden in a medium Z package.

In the preferred embodiment, the compatibility of the actual and reference distribution obtained for ca. 7500 muons per one minute exposure is evaluated using the Kolmogorov-Smirnov test, though other statistical approaches may apply. The Kolmogorov-Smirnov test is a form of minimum distance estimation used as a nonparametric test of equality of probability distributions used to compare a sample with a reference probability distribution; this test is very sensitive. This algorithm could easily be embedded in an FPGA device although the control computer does it as well. The test works under the prescription of 10×10×10 cm phantom with a one minute exposure.

In another embodiment the correlation of the actual and reference deviation distributions is evaluated using the moments of the distributions including mean, standard deviation, skewness, and curtosis. FIG. 4 shows that the standard deviation data is more illustrative compared to the mean value.

In yet another embodiment, the correlation of the actual and reference distributions is evaluated using a principal component analysis via Karhunen Loeve transform.

In one embodiment the predetermined criterion is chosen to provide the probability of the positive detection of high Z material above 90%. The predetermined difference value also depends on geometrical parameters of the system and a type and size of object under investigation. Large size muon detectors are preferable for the disclosed system. For example, a muon detector of at least 1 square meter size must be used to detect hidden nuclear materials in cargo. The distance between the first and the second muon detectors may be from 10 cm to 5 meters.

The amount of muons with energy below 1 GeV is about 25% in the atmospheric flow; therefore it is important to take into account the deflection dependence on the muon velocity into the final calculations to improve the system accuracy and reliability.

Figure 5:
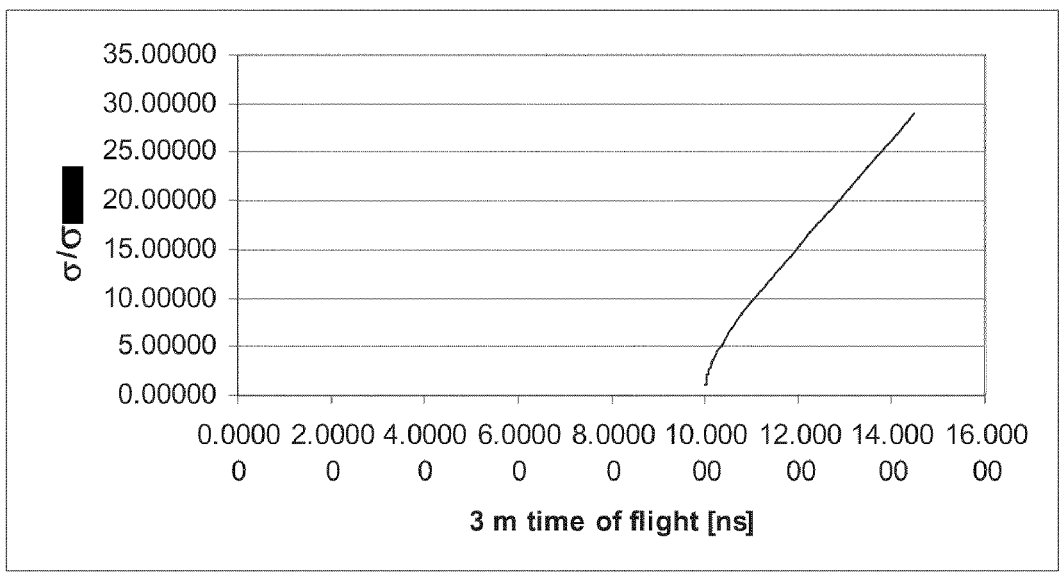
FIG. 5 Muon deflection dependence on the particle velocity.

Low-energy muons may produce false positive signals, i.e. large scattering in materials, even in absence of high Z substance. High-energy muons may be deflected at rather small angles, but still can provide important data on the high-z material presence inside the interrogated volume. The width of the angles distribution vs. the muon time of flight between the upper and lower detectors is shown in FIG. 5. An estimation of the muon energy is carried out basing on measuring the muon transit time between upper 14, 15 and lower 12, 13 detectors. The actual transit time is measured using pulses generated by a clock associated with scintillation counter 2. Counting is started by a signal produced by the muon passing through the top detector and stopped by a signal in the scintillation counter at the bottom detector. Both signals from the upper and lower detectors are transmitted via channels 23 and 24 (FIG. 3) into a time measuring unit 25, which is a part of the DSP unit 19. The time of flight depends on the system parameters: the total distance between the upper and lower detectors, the scintillation counter jitters and the scintillation counter performance vs. the speed of the clock. In one of the embodiments a scintillator BC422Q from Saint Gobain, Valley Forge, Pa. with response within 0.7 ns was implemented.

A variety of charged particles triggers the detectors 14 and 15. Some particles with a very low energy level do not get in touch with the detector 15. Particles with higher energy level can reach the lower set of the detectors 12, 13. Only those particles that were registered by all four detectors 12, 13, 14, and 15 are processed in the digital signal processing unit 19. The system of four detectors automatically performs muon selection since other particles do not possess enough energy to penetrate all four detectors. In out numerical simulations shown in FIG. 4, only about 1330 muons out of initial 7800 have reached the lower detector and their characteristics were processed. In this simulation we took into account the energy spectrum and the incident angles distribution of natural muons, which was measured experimentally.

Since low-energy muons may provide false information on the presence of high-z material by providing data with relatively large deflection angles, in one embodiment the contribution of muons having energies below 0.7 Gev/c were excluded from the final calculations.

Figure 6:
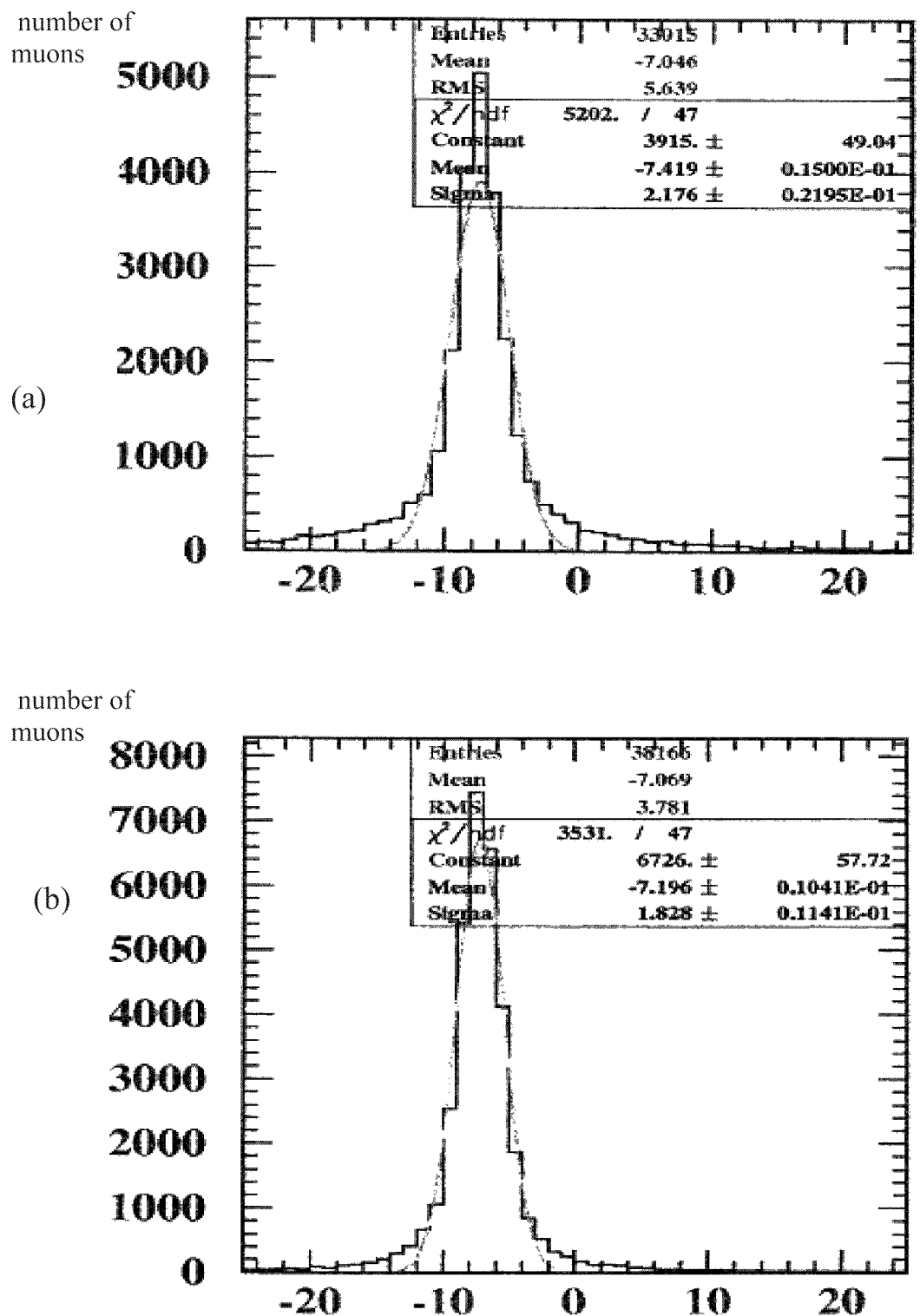
FIG. 6 Experimental results of muon deflection in the system (a) with lead, and (b) without lead in between the detectors.

FIG. 6 represents the experimental results that demonstrate the system performance. FIG. 6($a$) presents the experimental results of the deflection angle measurement when a thick layer of lead was placed in between the upper and lower detectors. Similar measurements without lead are shown in FIG. 6($b$). The increase of RMS (root mean square) from 3.7 to 5.6 mrad is observed.

Velocity measurement for very fast muons requires technique that is different than the described above. In the preferred embodiment the velocity measuring unit 26 (FIG. 3) is positioned below the coordinate measuring detector 12,13 and operates independently. However any other location of the velocity measuring unit is possible as long as it is on the muon way. The information from the unit 26 is transferred to the digital signal processing unit 19, and the expected leaving angle is calculated using this data from the unit 26.

In one embodiment a threshold Cerenkov counter is implemented for rejection of the contribution of muons with energies above some predetermined threshold to improve the signal-to noise ratio of the detection.

In one embodiment the suspicious container or vehicle is placed in between the top and the bottom detectors, and the muon deflection is measured. Alternatively the measurement is performed when a vehicle with the container moves through the system of detectors.

The muon detectors may be manufactured being hidden or camouflaged in the environment. The bottom sensor or U-shaped system of sensors may be positioned under the ground.

Obviously, the system may not be limited by one muon detector. In one embodiment, the system includes multiple muon detectors combined with the velocity measurement units. The data from all sensors enters digital signal processing (DSP) unit, where the expected trajectory of each particular muon is calculated and compared with the measured result. In one embodiment the results of the data analysis are shown on display. The system may also include an alarm. If the deviation of the measured parameter differs from the calculated one more than a predetermined value, the alarm starts; it may be audible or visual alarm.

Security check point with muon detector may be combined with other sensor equipment.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

The system can be installed on roads, in tunnels, in cargo station, in seaports and other locations. Toll stations could be convenient places for installations of such nuclear material detectors. The similar system of sensors may be installed at luggage transportation conveyor.

The invention claimed is:

1. A system for nuclear material detection inside an interrogated volume, comprising:
    at least a first flat muon detector and a second flat muon detector positioned above and below, respectively, the interrogated volume on the way of muons, the first muon detector is indicative of a first muon location and a first incidence angle, and the second muon detector is indicative of a second muon location and a second incidence angle,
    the DSP unit accumulates data on the second muon location and the second incidence angle;
    the DSP unit compares the actual muon deviation distribution and a reference deviation distribution from a database; wherein the deviation is the difference between the first angle and the second angle;
    the DSP unit make a decision on the presence or absence of the high Z material inside the interrogated volume if a correlation between the actual and the reference deviation distributions is below or above a predetermined value, respectively.

2. The system according to claim 1, wherein the reference database is the result of numerical simulations.

3. The system according to claim 2, wherein the numerical simulations implementing a multiple scattering algorithm.

4. The system according to claim 2, wherein the numerical simulations taking into account the energy spectrum of natural muons being measured experimentally.

5. The system according to claim 2, wherein the numerical simulations taking into account the incident angles distribution of natural muons being measured experimentally.

6. The system according to claim 1, wherein the reference database is formed from experimental results of measurements of the muon deviations caused by a presence of various objects inside the interrogated volume.

7. The system according to claim 6, wherein the reference database is constantly updated with the experimental data during the system exploitation; each result of testing is forwarded to the reference database.

8. The system according to claim 1, wherein the correlation of the actual and reference deviation distributions is evaluated using the moments of the distributions including mean, standard deviation, skewness, and curtosis.

9. The system according to claim 4, wherein the correlation of the actual and reference distributions is evaluated using the Kolmogorov-Smirnov test.

10. The system according to claim 1, wherein the correlation of the actual and reference distributions is evaluated using a principal component analysis via Karhunen Loeve transform.

11. The system according to claim 1, wherein the time interval is about one minute.

12. The system according to claim 1, wherein the time interval is from 1 to 10 minute range.

13. A method for nuclear material revealing inside an interrogated volume, comprising the steps of:
    continuously measuring a first location and a first incident angle of incoming muons by a first detector,
    continuously measuring a second location and a second incidence angle for each incoming muon by a second detector,
    accumulating data on the first and second muon locations and the first and second incidence angles during a time interval;
    computing the distribution of deviations of all muons participating in the exposure; wherein the deviation is the difference between the first and the second angles; and
    making a decision on the presence or absence of the high Z material inside the interrogated volume if a correlation between the actual deviation distribution and a reference deviation distribution from a database is below or above a predetermined value, respectively.

14. The method according to claim 13, further comprising additional testing of the interrogated volume in case when the decision indicates the presence the high Z material.

15. The method according to claim 14, wherein the additional testing includes
    performing the same operations with a time interval several times longer than in the initial testing.

16. The method according to claim 15, wherein the additional testing is four times longer than the initial testing.

17. The method according to claim 16, wherein the time interval of the initial testing is about one minute.

18. The method according to claim 13, wherein the database is formed from experimental results of measurements of the muon deviations caused by a presence of various objects inside the interrogated volume.

19. The method according to claim 13, wherein the database is a result of numerical simulation.

20. The method according to claim 13, wherein the correlation of the actual and reference deviation distributions is evaluated using the Kolmogorov-Smirnov test.

* * * * *